US012386237B2

(12) United States Patent
Mishra et al.

(10) Patent No.: US 12,386,237 B2
(45) Date of Patent: Aug. 12, 2025

(54) ULTRA-BROADBAND MID-INFRARED GENERATION IN DISPERSION-ENGINEERED THIN-FILM LITHIUM NIOBATE

(71) Applicants: NTT RESEARCH, INC., Sunnyvale, CA (US); THE BOARD OF TRUSTEES OF THE LELAND STANFORD JUNIOR UNIVERSITY, Stanford, CA (US)

(72) Inventors: Jatadhari Mishra, Stanford, CA (US); Marc Jankowski, Sunnyvale, CA (US); Alexander Y. Hwang, Stanford, CA (US); Hubert S. Stokowski, Stanford, CA (US); Timothy P. McKenna, Sunnyvale, CA (US); Amir H Safavi-Naeini, Stanford, CA (US); Martin M. Fejer, Stanford, CA (US)

(73) Assignees: NTT RESEARCH, INC., Sunnyvale, CA (US); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 168 days.

(21) Appl. No.: 18/196,764

(22) Filed: May 12, 2023

(65) Prior Publication Data
US 2023/0367177 A1    Nov. 16, 2023

Related U.S. Application Data

(60) Provisional application No. 63/341,997, filed on May 13, 2022.

(51) Int. Cl.
G02F 1/355       (2006.01)
G02F 1/35        (2006.01)
G02F 1/39        (2006.01)

(52) U.S. Cl.
CPC .......... G02F 1/3551 (2013.01); G02F 1/3546 (2021.01); G02F 1/3548 (2021.01);
(Continued)

(58) Field of Classification Search
CPC ...... G02F 1/3548; G02F 1/3558; G02F 1/377; G02F 1/3775; G02F 1/3551; G02F 1/3546; G02F 1/392; G02F 1/395
See application file for complete search history.

(56) References Cited

U.S. PATENT DOCUMENTS 8,346,025 B2 *   1/2013   Gill ................... G02F 1/2257
                                                          438/31
11,226,538 B2 *  1/2022   Marandi ................ G02F 1/39
(Continued)

OTHER PUBLICATIONS

Jatadhari Mishra, et al., "Ultra-broadband mid-infrared generation in dispersion-engineered thin-film lithium niobate," Opt. Express 30, 32752-32760 (2022). (Year: 2022).*
(Continued)

Primary Examiner — Rhonda S Peace
(74) Attorney, Agent, or Firm — DLA Piper LLP US

(57) ABSTRACT

In some embodiments, a device for generating mid-infrared radiation is provided. The device may include a thin film quadratic nonlinear waveguide formed on a mid-infrared transparent cladding by a thin film material of a predetermined film thickness, the waveguide having a predetermined etch depth and a predetermined top width. At least one of the predetermined film thickness, the predetermined etch depth, and the predetermined top width may be tuned for the device to generate a coherent idler wave as a mid-infrared radiation from a fixed pump wave and a tunable signal wave.

17 Claims, 16 Drawing Sheets

(52) U.S. Cl.
CPC .............. *G02F 1/392* (2021.01); *G02F 1/395* (2013.01); *G02F 2202/07* (2013.01); *G02F 2202/20* (2013.01)

(56) References Cited

U.S. PATENT DOCUMENTS

| | | | | |
|---|---|---|---|---|
| 11,469,567 B2* | 10/2022 | Fejer | ........................ | G02F 1/395 |
| 11,537,026 B2* | 12/2022 | Zhang | ................... | G02F 1/3536 |
| 11,971,644 B2* | 4/2024 | Embutsu | ............... | G02F 1/3546 |
| 2022/0123516 A1* | 4/2022 | Guo | ...................... | H01S 3/1109 |
| 2023/0367177 A1* | 11/2023 | Mishra | .................... | G02F 1/395 |

OTHER PUBLICATIONS

Fiaboe, Kokou et al. (2024). "Mid-IR Supercontinuum Generation in a Silicon Nitride loaded Lithium Niobate on Sapphire Waveguide". Photonics and Nanostructures—Fundamentals and Applications. 60. 101274. (Year: 2024).*

Chiles, J., et al. (2019) "Multi-functional integrated photonics in the mid-infrared with suspended AlGaAs on silicon", Optica (Accessed Dec. 19, 2024). (Year: 2024).*

Marc Jankowski, Carsten Langrock, Boris Desiatov, Alireza Marandi, Cheng Wang, Mian Zhang, Christopher R. Phillips, Marko Lonar, and M. M. Fejer, "Ultrabroadband nonlinear optics in nanophotonic periodically poled lithium niobate waveguides," Optica 7, 40-46 (2020). (Year: 2020).*

Y. Di et al., "Widely Tunable OPO Spanning From the Violet to Mid-Infrared Based on Aperiodic QPM Crystal," in IEEE Photonics Technology Letters, vol. 34, No. 13, pp. 683-686, 1 Jul. 1, 2022. (Year: 2022).*

* cited by examiner

700

ULTRA-BROADBAND MID-INFRARED GENERATION IN DISPERSION-ENGINEERED THIN-FILM LITHIUM NIOBATE

CROSS-REFERENCE TO RELATED APPLICATIONS

This application claims the benefit of U.S. Provisional Application No. 63/341,997, filed May 13, 2022, the entirety of which is incorporated herein by reference.

GOVERNMENT SUPPORT

This invention was made with Government support under contract D19AP00040 awarded by the Defense Advanced Research Projects Agency, under contract DE-AC02-76SF00515 awarded by the Department of Energy, under contract 1918549 awarded by the National Science Foundation, under contract 1542152 awarded by the National Science Foundation, under contract 2026822 awarded by the National Science Foundation, under contract 2011363 awarded by the National Science Foundation, and under contract 2146755 awarded by the National Science Foundation. The Government has certain rights in the invention.

TECHNICAL FIELD

This disclosure relates to the field of coherent mid-infrared light generation. More particularly, this disclosure relates to mid-infrared generation in dispersion-engineered thin-film lithium niobate on a sapphire.

BACKGROUND

Electromagnetic radiation has a plethora of usages. For example, radio frequency waves are used for communications; lasers are used for communications and industrial cutting and welding; electromagnetic spectral analysis is used for detecting physical, chemical, and biological properties. Electromagnetic spectral analysis particularly involves generating coherent radiation, i.e., radiation of the same frequency/wavelength. For example, for many atmospheric molecules and functional groups, a 3-5 micrometer (μm) mid-infrared (IR) region generally contains the strongest absorption bands. The mid-IR region therefore is desired for spectroscopic sensing and environmental monitoring.

One traditional method of generating a coherent electromagnetic radiation—such as mid-IR radiation—is to perform a difference frequency generation. The difference frequency generation takes in two optical inputs: a fixed pump wave and a tunable signal wave. These two inputs are fed into a waveguide that includes a non-linear crystal material that generates an idler wave as an output. The idler wave is generally at a lower frequency than the pump wave, e.g., the frequency of the idler wave is the difference between the frequency of the pump wave and the signal wave.

Bulk lithium niobate ($LiNbO_3$) based waveguides have been used to generate mid-IR radiation as idler wave using the difference frequency generation. In these waveguides, however, material dispersion may cause each of the signal wave and the idler wave to propagate at different group velocities thereby reducing interaction bandwidth. Furthermore, the tunability of the both the signal wave and the idler wave is severely limited in these waveguides.

Other conventional designs include on-chip nonlinear-optical broadband mid-IR sources based on silicon or silicon nitride. These designs use Kerr nonlinearity for converting near-IR frequencies to mid-IR frequencies. But these Kerr nonlinearity based designs are hugely inefficient and consume a lot of power.

As such, a significant improvement in devices for generating mid-IR radiation is therefore desired.

SUMMARY

In some embodiments, a device for generating mid-infrared radiation is provided. The device may include a thin film quadratic nonlinear waveguide formed on a mid-infrared transparent cladding by a thin film material of a predetermined film thickness, the waveguide having a predetermined etch depth and a predetermined top width. At least one of the predetermined film thickness, the predetermined etch depth, and the predetermined top width may be tuned for the device to generate a coherent idler wave as a mid-infrared radiation from a fixed pump wave and a tunable signal wave.

In some embodiments, a method of generating mid-infrared radiation is provided. The method may include pumping a fixed wave and a tunable signal to a thin film quadratic nonlinear waveguide formed on a mid-infrared transparent cladding by a thin film material of a predetermined film thickness, the waveguide having a predetermined etch depth and a predetermined top width. The method may also include generating, by the ridge waveguide based on tuning at least one of the predetermined film thickness, the predetermined etch depth, and the predetermined top width, a coherent idler wave as a mid-infrared radiation from the fixed wave and the signal wave.

In some embodiments, a method of manufacturing a device for generating mid-infrared radiation is provided. The method may include forming a thin film quadratic nonlinear waveguide on a mid-infrared transparent cladding by a thin film material, the ridge waveguide having an etch depth and a top width. The method may also include tuning at least one of the a film thickness of the thin film material, the etch depth, and the top width for the device to generate a coherent idler wave as a mid-infrared radiation from a fixed pump wave and a tunable signal wave.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1A:
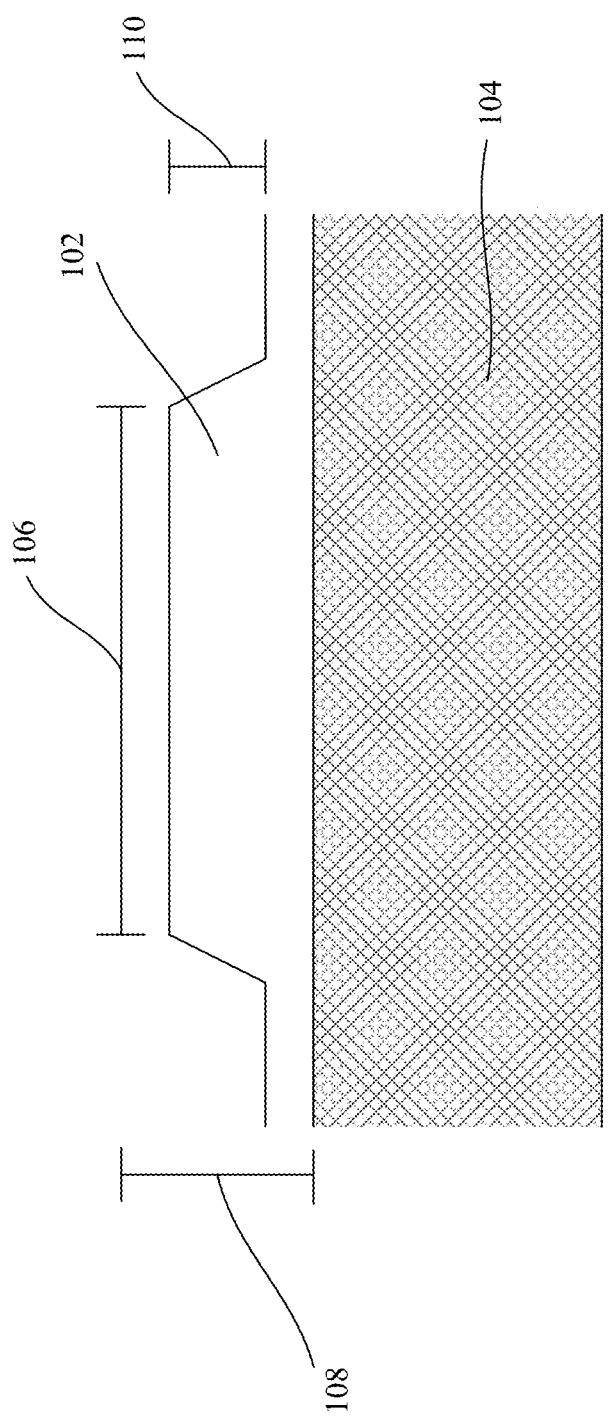
FIGS. 1A-1D depict an illustrative device for generating mid-IR radiation, according to example embodiments of this disclosure.

Embodiments disclosed herein may relate to broadly tunable mid-IR difference frequency generation in dispersion-engineered thin-film lithium niobate ridge waveguides on sapphire. The devices as described herein may include uniformly poled devices that can achieve phase-matching bandwidths in excess of a micron, and rapid phase-matching peak tuning across different temperatures.

FIGS. 1A-1D depict an illustrative device 100 for generating mid-IR radiation, according to example embodiments of this disclosure. It should, however, be understood that the device 100 and its tuned dimensions are just for illustration only and should not be considered limiting. Devices with different tuned dimensions or having additional, alternate, or fewer number of components should be considered within the scope of this disclosure.

The device 100 may include a ridge waveguide 102 formed on a sapphire 104, which may form a mid-infrared transparent cladding. The ridge waveguide 102 may be etched out of a thin-film lithium niobate (TFLN) with a film thickness 108. The etching may be performed to an etch depth 110 while maintaining a top width 106 (e.g., non-etched portion). The ridge waveguide 102 formed by thin film lithium niobate is just an example and should not be considered limiting. For example any type of thin film quadratic nonlinear waveguide should be considered an example of the ridge waveguide 102. The ridge waveguide 102, to realize the quadratic nonlinearity, may be formed of materials with optical domain inversion structures with modulated signs of non-linear coefficients for implementing quasi phase matching for nonlinear frequency conversion. Therefore, use of thin film lithium niobate may provide such quadratic nonlinearity for the ridge waveguide 102. Other thin film materials may be used in addition to or as an alternate to the thin film lithium niobate. Some non-limiting examples may include ferroelectrics such as lithium tantalate and potassium titanyl phosphate, and semiconductors such as gallium arsenide, gallium phosphide, and zinc selenide. These materials are just illustrative only and any material with quadratic nonlinearity that may be implemented as thin-film on mid-IR transparent cladding stacks with periodic inversion of the sign of the quadratic nonlinearity should be considered within the scope of this disclosure. The sapphire 104 is just but an example of a mid-infrared transparent cladding. Any type of mid-infrared transparent material may be used for the cladding. Some other non-limiting examples of the mid-infrared transparent materials for the cladding may include tantalum pentoxide, magnesium fluoride, calcium fluoride, etc. In some embodiments, the mid-infrared transparent cladding (e.g., cladding formed by the sapphire 104) may be multilayer cladding. Generally, the mid-infrared transparent cladding may be used such that the mid-IR radiation (e.g., a coherent idler wave as discussed below) does not get absorbed by the cladding.

Figures 1B, 1C, 1D:
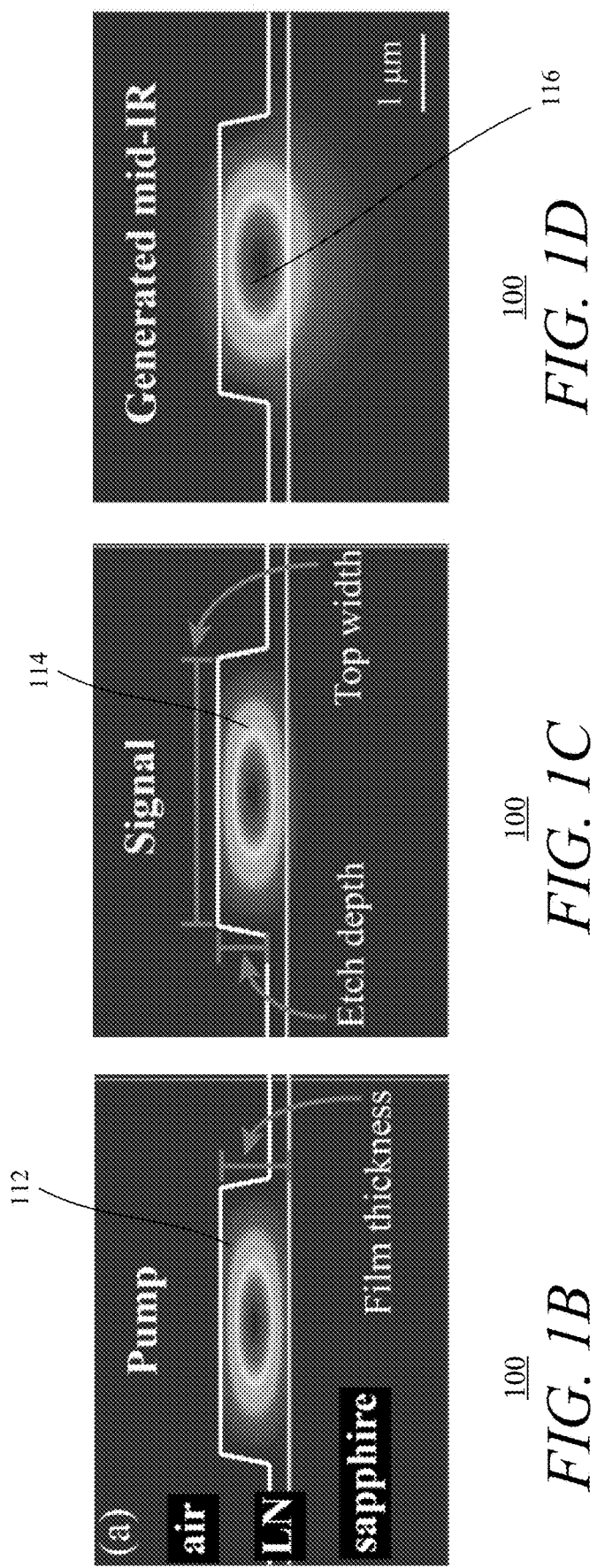

The device 100 may generate a mid-IR radiation through a difference frequency generation. That is, the ridge waveguide 102 may receive a fixed pump wave and a tunable signal wave, and due to its $\chi^{(2)}$ nonlinearity (i.e., quadratic nonlinearity), may generate an idler wave in the mid-IR range. For example, FIG. 1B depicts a fixed pump wave 112 within the ridge waveguide 102, FIG. 1C depicts a tunable signal wave 114 within the ridge waveguide 102, and FIG. 1D depicts the generated idler wave 116 within the ridge waveguide 102. The generated idler wave 116 may be within the mid-IR range. For example, the generate idler wave 116 may be based on the difference between the fixed pump wave 112 and the tunable signal wave 114.

The dimensions of the device 100 may be tuned to predetermined lengths to generate the idler wave at a predetermined frequency in the mid-IR range. Additionally, in some embodiments, the predetermined frequency of the idler wave in the mid-IR range may be based on a predetermined periodic invention of quadratic nonlinearity (i.e., $\chi^{(2)}$ nonlinearity) In some embodiments, the etch depth 110 may tuned to approximately 670 nm, the top width 106 may tuned to approximately 3660 nm, and film thickness 108 may tuned to approximately 940 nm. Using these tuned dimensions, the fixed pump wave 112 of approximately 1.064 μm and the tunable signal wave 114 of 1.529 μm may be used to generate the idler wave of 3.5 μm, which is within the mid-IR range. It should, however, be understood that these are just example tuned dimensions, and, as further described below, other dimensions should also be considered within the scope of this disclosure.

During fabrication, each of the TFLN film thickness 108, etch depth 110, and the top width 106 can be individually tuned. The tuning may be to minimize group velocity mismatch between the tunable signal wave 114 and the idler wave 116 such that the device 100 may generate the idler wave 116 as a coherent radiation over a large bandwidth (e.g., for ultra-broadband operation). For instance, the ultra-broadband operation may be facilitated by the fixed pump wave 112 (e.g., at 1.064 μm) and the tunable signal wave 114 (e.g., at the telecommunications band). Mathematically, let the angular frequency (2πf) of the fixed pump wave 112 be represented as $\omega_p$, the angular frequency of the tunable signal wave 114 be represented as $\omega_s$, and the angular frequency of the idler wave 116 be represented as $\omega_i$. The ridge waveguide 102 may be periodically poled (i.e., the refractive index being periodically altered) to quasi-phase match all of $\omega_p$, $\omega_s$, and 107 $_i$. The bandwidth of a quasi-phase matched differential frequency generation process with a fixed pump wave 112 (i.e., having a fixed angular frequency $\omega_p$) may be determined by the variation of the phase mismatch $$\Delta k(\Omega) = k(\omega_p) - k(\omega_s - \Omega) - k(\omega_i + \Omega) - 2\pi/\Lambda$$

as the tunable signal wave 114 and the generated idler wave 116 are detuned by $\Omega$ relative to the nominally phase matched frequency $\omega_i$. Here k ($\omega$) may be the propagation constant for the fundamental transverse electric (TE$_{00}$) node, and $\Lambda$ may be a poling period chosen to achieve $\Delta k(\Omega=0)=0$. To leading order in $\Omega$, the Taylor series expansion of the phase-mismatch may be given by $\Delta k(\Omega)=(v_{g,i}^{-1}-v_{g,s}^{-1})\Omega$, where $\Omega$, as described above, may correspond to a small change in the generated idler wave 116 frequency relative to $\omega_i$ as the signal frequency is changed by the same amount in the vicinity of $\omega_s$, where $$v_{g,i/s}\left(=\left(\frac{dk}{d\omega_{\frac{i}{s}}}\right)^{-1}\right)$$

are the respective group velocities, and where $(v_{g,i}^{-1}-v_{g,s}^{-1})$ can be referred to as the group velocity mismatch between the signal and the idler waves. A broadband (or ultra-broadband) operation can be obtained when the group velocity mismatch≈0.

In some embodiments, during fabrication, the phase mismatch $\Delta k(\Omega)$ may be engineered by tuning the geometry of the ridge waveguide 102. Each of the film thickness 108, the etch depth 110, and the top width 106 may be independently tuned, as described above. In some embodiments, to find the appropriate geometry for the waveguide 102 for broadband difference frequency generation, a three-dimensional parameter space (i.e., representing the film thickness 108, the etch depth 110, and the top width 106) may be searched, and the group velocity mismatch between the tunable signal wave 114 and the idler wave 116 may be visualized using a combination of multiple two-dimensional plots where two of the independent geometry parameters are swept, while the third is held constant. Based on these parameter sweeps, an example of the etch depth 110 may be ~670 nm, the top width 106 may be ~3660 nm, and the film thickness 108 may be ~940 nm.

Figure 2A:
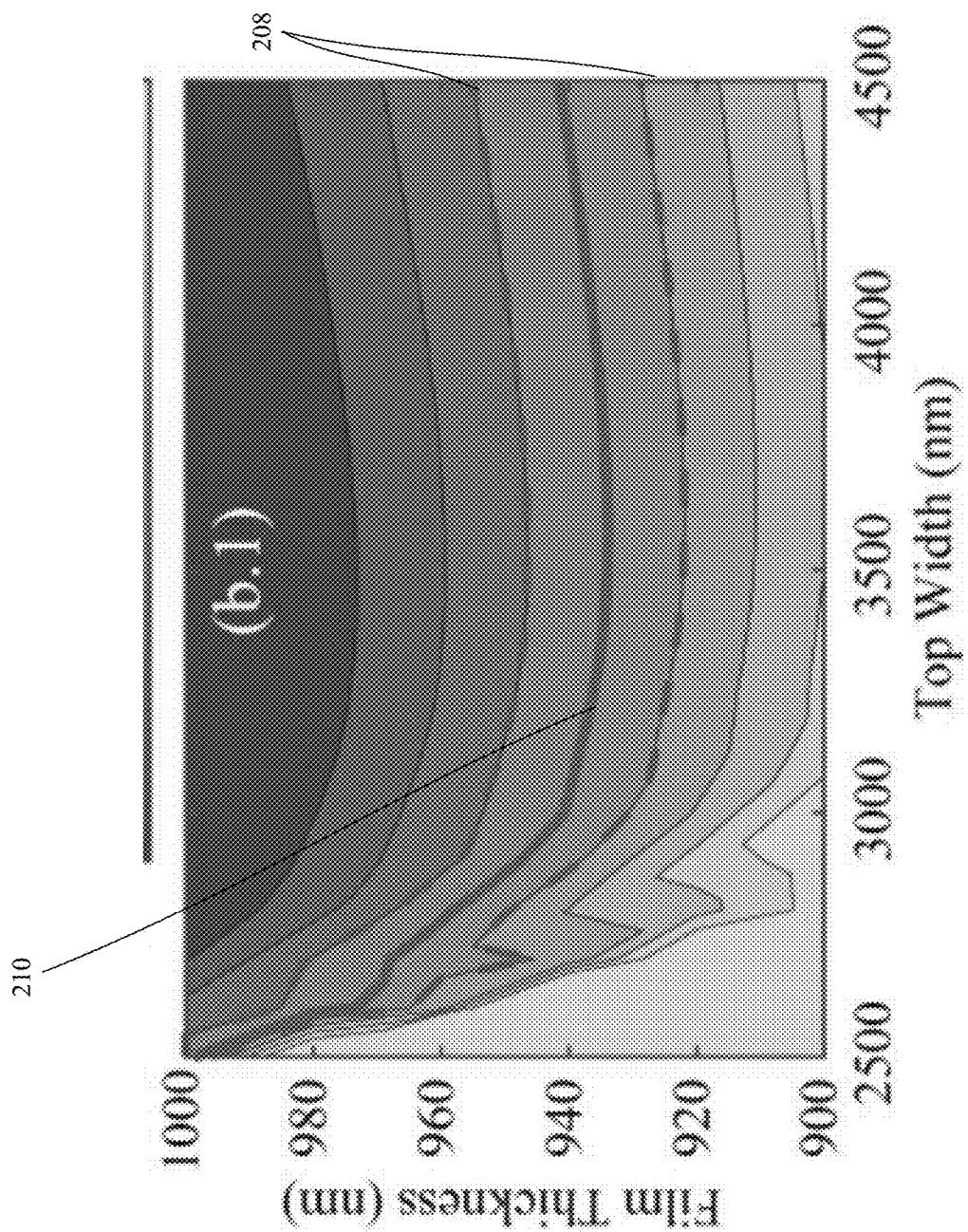
FIGS. 2A-2C depict illustrative plots used to minimize group velocity mismatch between a signal wave and an idler wave, according to example embodiments of this disclosure.
Figure 2B:
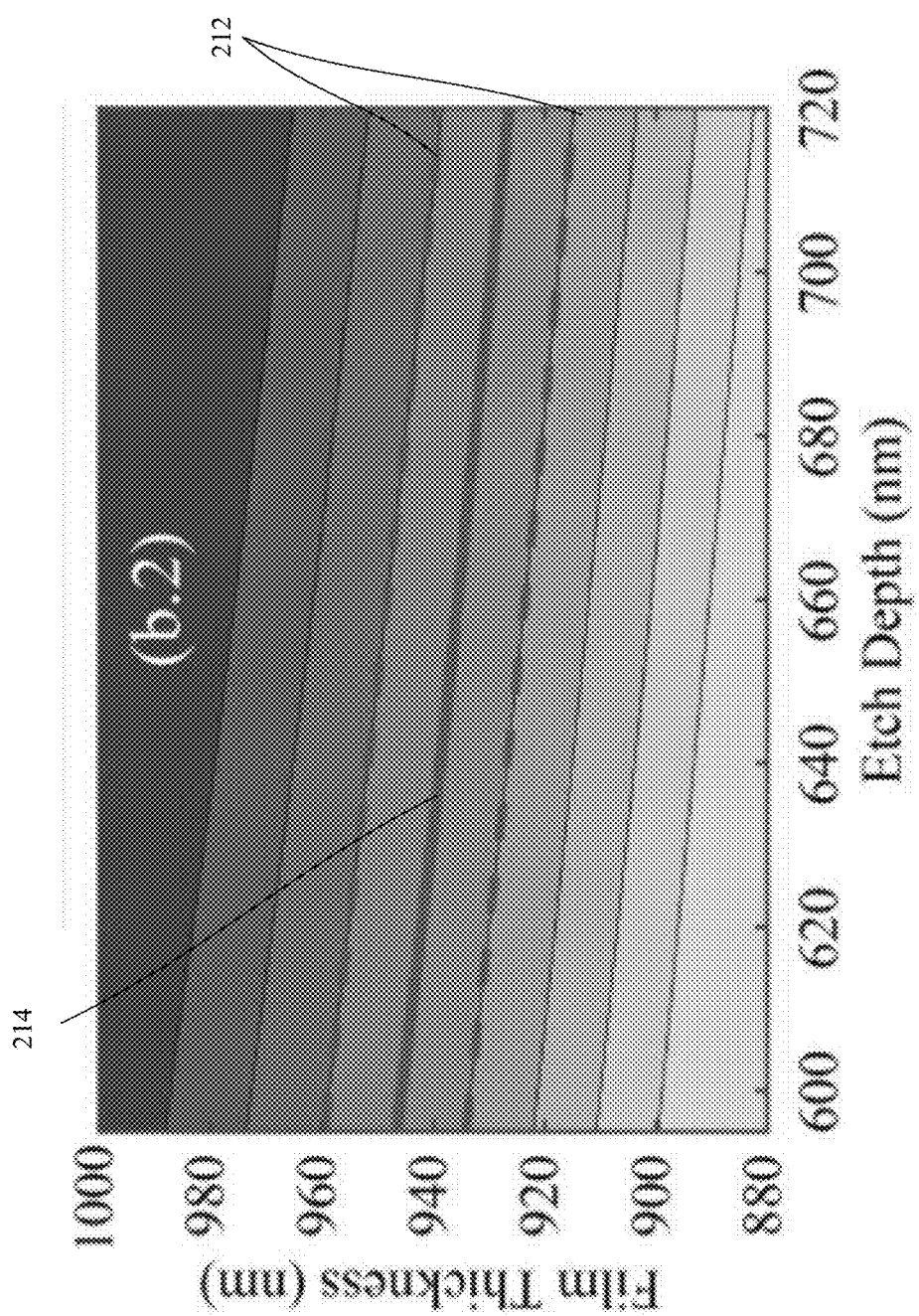
Figure 2C:
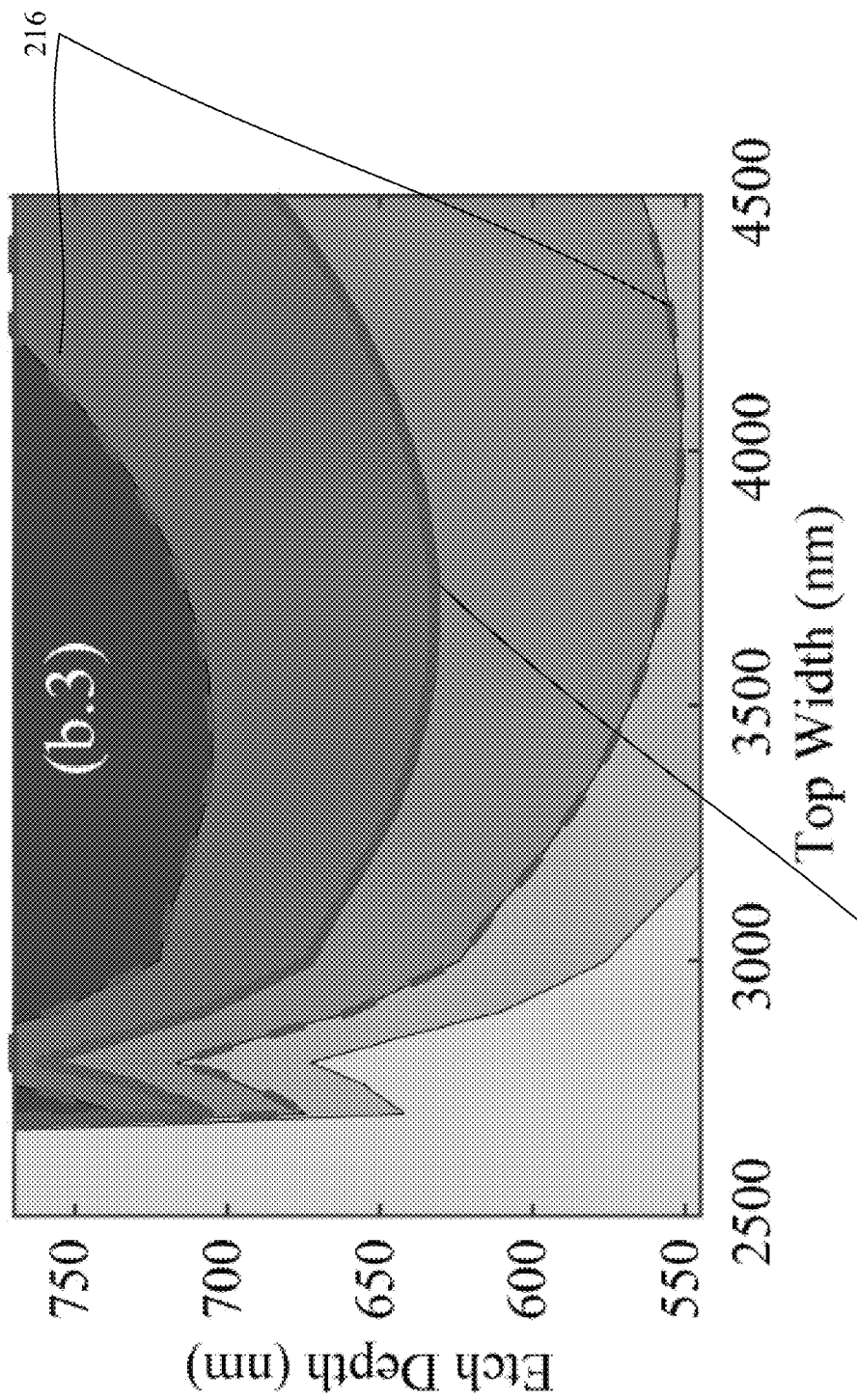

FIGS. 2A-2C depict illustrative plots 202, 204, 206 used to minimize group velocity mismatch between the signal wave 114 and the idler wave 116, according to example embodiments of this disclosure. The illustrative plots 202, 204, 206 may be for the tunable signal wave 114 at 1.56 μm and the idler wave at 3.35 μm. For each of the plots 202, 204, 206, one geometry parameter out of the three geometry parameters (the film thickness 108, the etch depth 110, and the top width 106) may be kept constant, and the remaining two geometry parameters are swept. For example, FIG. 2A illustrates in example in which the etch depth 110 is fixed at 670 nm and the film thickness 108 (y-axis) and the top width 106 (x-axis) are varied. The zero group velocity mismatch contour 210 is shown as a solid line, while the group velocity mismatch contours 208 within the range of 10 fs/mm (femtoseconds/millimeter) are shown as dashed lines. FIG. 2B illustrates an example in which the top width 106 may be fixed at 3660 nm, and the film thickness 108 (y-axis) and the etch depth 110 (x-axis) may be varied. The zero group velocity mismatch contour 214 is shown as a solid line, while the group velocity mismatch contours 212 within the range of 10 fs/mm are shown as dashed lines. FIG. 2C illustrates an example in which the film thickness 108 may be fixed at 940 nm, and the etch depth 110 (y-axis) and the top width 106 (x-axis) may be varied. The zero group velocity mismatch contour 218 is shown as a solid line, while the group velocity mismatch contours 216 within the range of 10 fs/mm are shown as dashed lines. In some embodiments, the group velocity mismatch contours 208, 212, 216 within the range of 10 fs/mm may be used for design tolerances for fabricating the device 100.

In some embodiments, the phase matching between the group velocities may be affected by temperature differences. For example, a rapid tuning of the phase matching can be observed with temperature, with a $$\frac{\Delta v}{v} \sim 3.2 * 10^{-3}/° C.$$

where v is the frequency. Additionally, the zeroing of the first order term of the group velocity mismatch in the Taylor series expansion of the phase-mismatch can suggest a second order (parabolic) dependence of phase matching versus the wavelength in the device 100.

Figure 3:
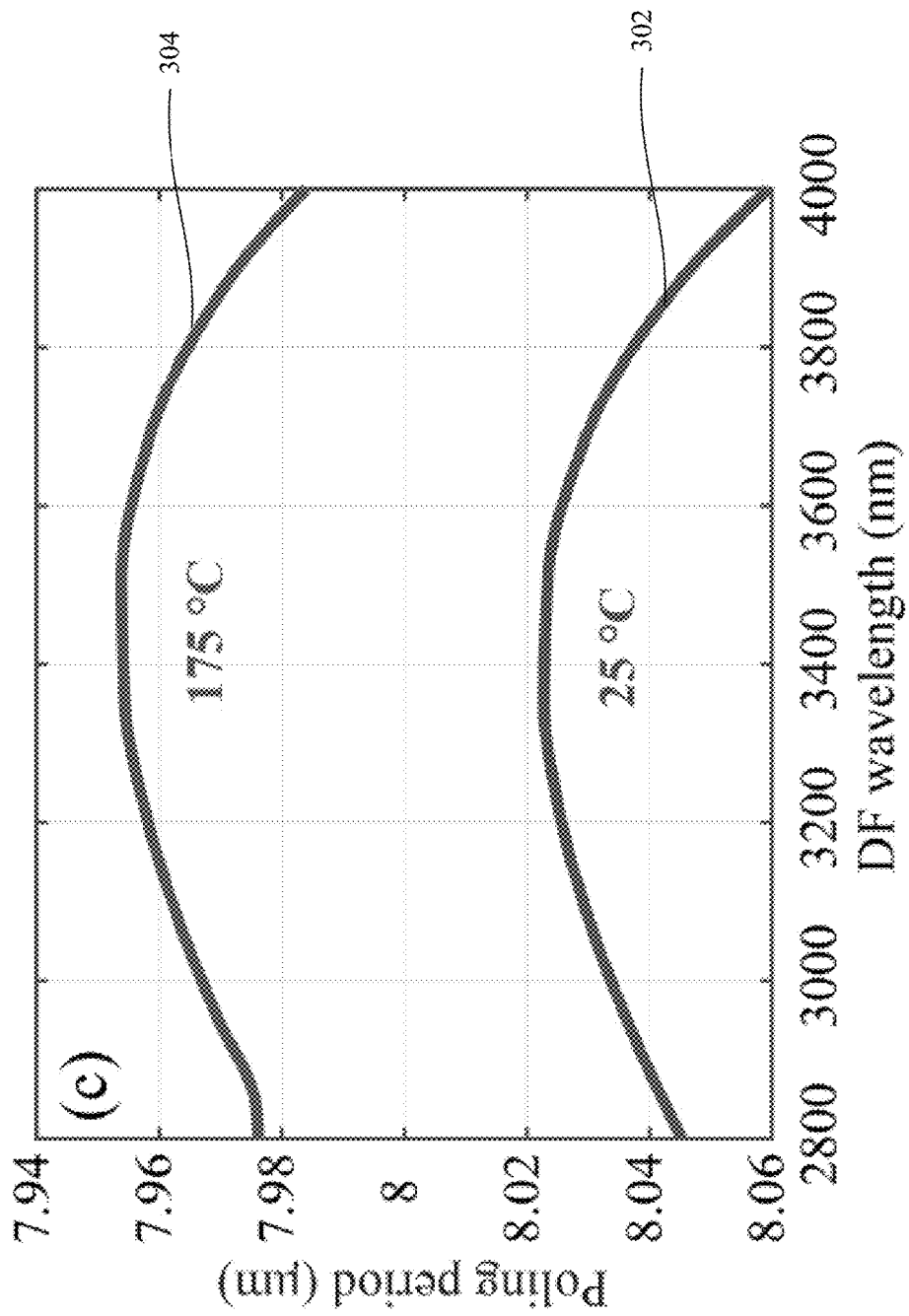
FIG. 3 depicts an illustrative plot showing effects of temperature in the difference frequency wavelengths, according to example embodiments of this disclosure.

For example, FIG. 3 depicts an illustrative plot 300 showing effects of temperature in the difference frequency wavelengths, according to example embodiments of this disclosure. In the y-axis a poling period is shown and in the x-axis the difference frequency wavelength is shown. A first phase matching contour ($\Delta k=0$) at 25° C. is shown as 302 and a second phase matching contour at 175° C. is shown as 304. Both phase matching contours 302, 304 may show a second order effects. Therefore, the poling period may also be another engineered parameter in the device 100, which may generate the idler wave 116 whose frequency may be controlled by the operating temperature of the device 100.

For instance, during fabrication, an X-cut on sapphire film of starting thickness 1 micron can be thinned down to 940 nanometers using Ar-ion milling. Periodic poling of the thin-film and subsequent waveguide fabrication may be performed to achieve the aforementioned geometry. The waveguides can be ~5 mm long and can be designed with a 30 μm long non-adiabatic linear taper with a 500 nm top width at the input facet, to facilitate fundamental excitation of the fixed pump wave 112 and the tunable signal wave 114. Furthermore, while each waveguide can be uniformly poled with a single poling period of around 8 μm, the periods can be swept across the device chip (e.g., containing the device 100) in steps of 20 nm for identical waveguides in order to allow for tuning of the phase matching peaks.

Figure 4:
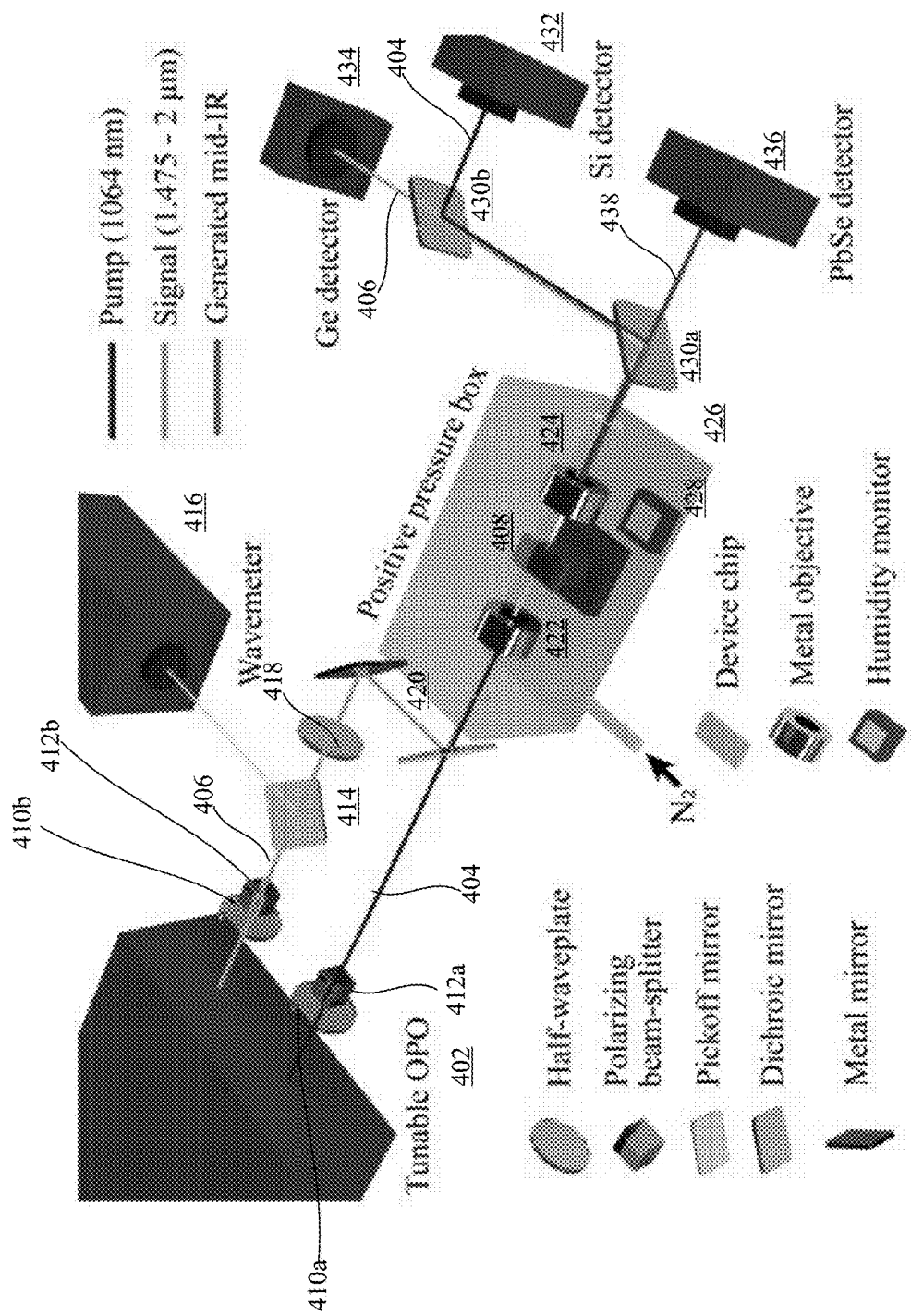
FIG. 4 depicts an illustrative experimental setup to verify the properties of a thin film lithium niobate mid-IR radiation generator, according to example embodiments of this disclosure.

FIG. 4 depicts an illustrative experimental setup 400 to verify the properties of a thin film lithium niobate mid-IR radiation generator, according to example embodiments of this disclosure. As shown, a tunable continuous-wave optical parametric oscillator (OPO) (e.g., Toptica TOPO) 402 can be used as the source for both the fixed 1.064 μm fixed pump wave 404 and the tunable (1.475-2 μm) signal wave 406 to a waveguide chip 408 to generate mid-IR radiation. Half-waveplates 410a, 410b and polarizing beam-splitters 412a, 412b combinations can serve as variable optical attenuators for both input beams (i.e., tunable signal wave 406 and the fixed pump wave 404). A pickoff mirror 414 set up in the path of the signal wave 406 can feed a wavemeter 416, which may continuously monitor the frequency of the signal wave 406 while it was being tuned by the OPO. The tunable signal wave 406 can be passed through another half-waveplate 418, set to pass transverse electric polarization except during efficiency measurements as described later, and finally co-aligned with the fixed pump wave 404 via a dichroic 420. The waveguide chip 408, mounted on a two-axis stage with vacuum suction and temperature control, and both an input objective 422 (e.g., Thorlabs LMM-40X-P01) and an output objective 424 (e.g., Thorlabs LMM-40X-P01) mounted on three-axis stages, can be housed inside a positive pressure plexiglass box 426 with nitrogen flow and cut-outs for the different waves to enter and exit the box 426. A humidity sensor 428 inside the box can enable real time monitoring. The reflective objectives 422, 424 can be used to avoid chromatic aberrations while focusing in and out of the waveguide chip 408 and facilitate ~1-2% input power coupling and output collection efficiencies of ~25%±1% at 1.064 µm, ~33%±1% in the 1.5 µm band, and ~40%±5% in the 3-µm band. At the output side of the setup 400, the transmitted fixed pump wave 404 and the tunable signal wave 406 and the generated mid-IR wave (i.e., idler wave) 438 can be separated using two dichroics 430a, 430b. The fixed pump wave 404 may be detected on a silicon power meter 432. The tunable signal wave 406 may be detected a germanium power meter 434. The mid-IR wave 438 may be detected by a lead selenide photoconductive detector 436 (e.g., Thorlabs PDA20H). During alignment into the waveguide chip 408, the fixed pump wave 404 and the tunable signal wave 406 modes at the output facet can be imaged using silicon and Indium gallium arsenide (InGaAs) cameras respectively to ensure single mode excitation.

FIGS. 5A-5D depict illustrative plots 502-508 showing measured and simulated normalized difference frequency transfer function and difference frequency wavelength at different temperatures, according to example embodiments of this disclosure. The difference frequency transfer function may indicate frequency selective (or wavelength selective) generation of the difference frequency wavelength. The difference frequency wavelength may indicate the wavelength of the generated idler wave. Furthermore, in the illustrative plots 502-508, the dots represented the measurements and the solid lines represent the simulation. Particularly, plot 502 shows the comparison between the measurements and simulation at a temperature of 175° C. Plot 504 shows the comparison between the measurements and simulation at a temperature of 180° C. Plot 506 shows the comparison between the measurements and simulation at a temperature of 185° C. Plot 508 shows the comparison between the measurements and simulation at a temperature of 190° C. As can be seen, there may be a close match between the actual measurements and simulation at different temperatures.

Figure 5A:
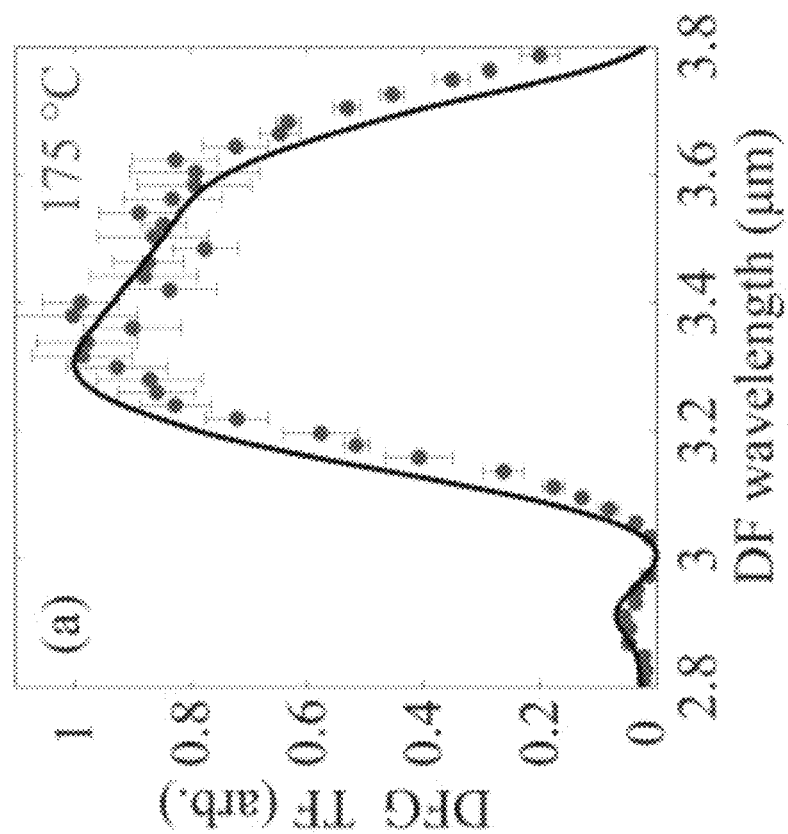
FIGS. 5A-5D depict illustrative plots showing measured and simulated normalized difference frequency transfer function and difference frequency wavelength at different temperatures, according to example embodiments of this disclosure.
Figure 5B:
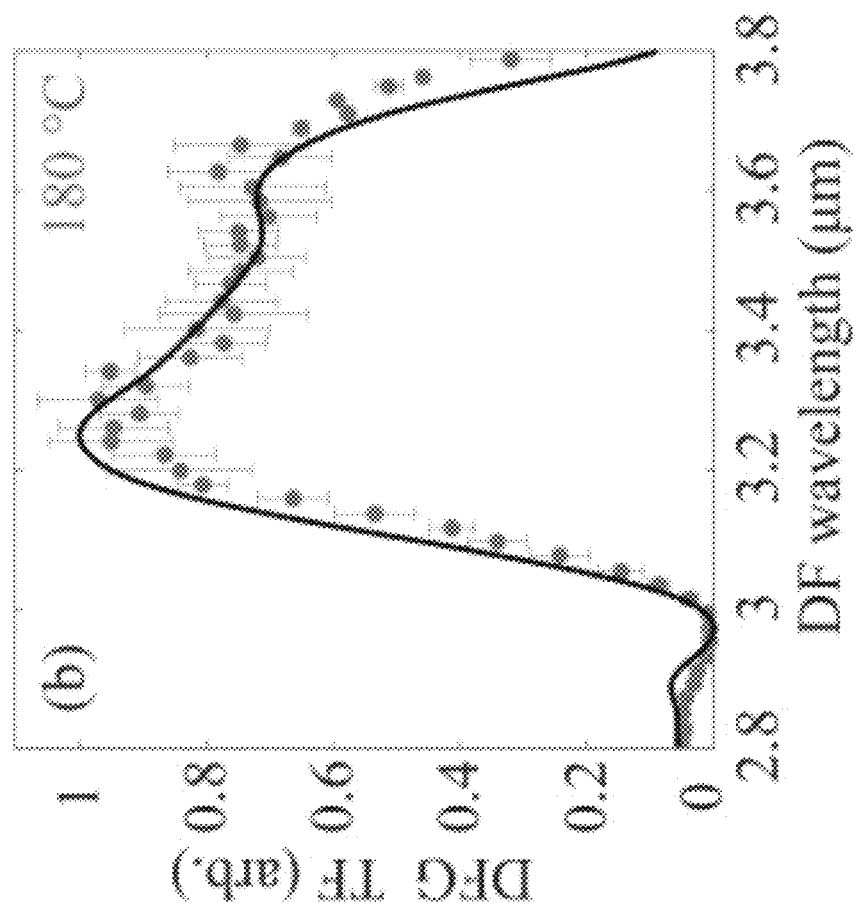
Figure 5C:
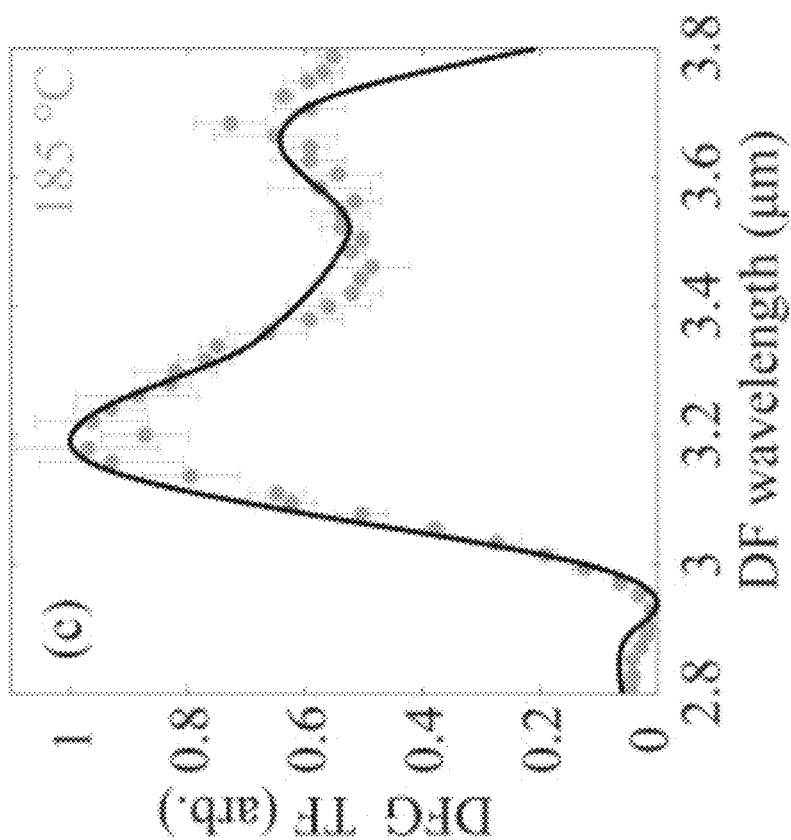
Figure 5D:
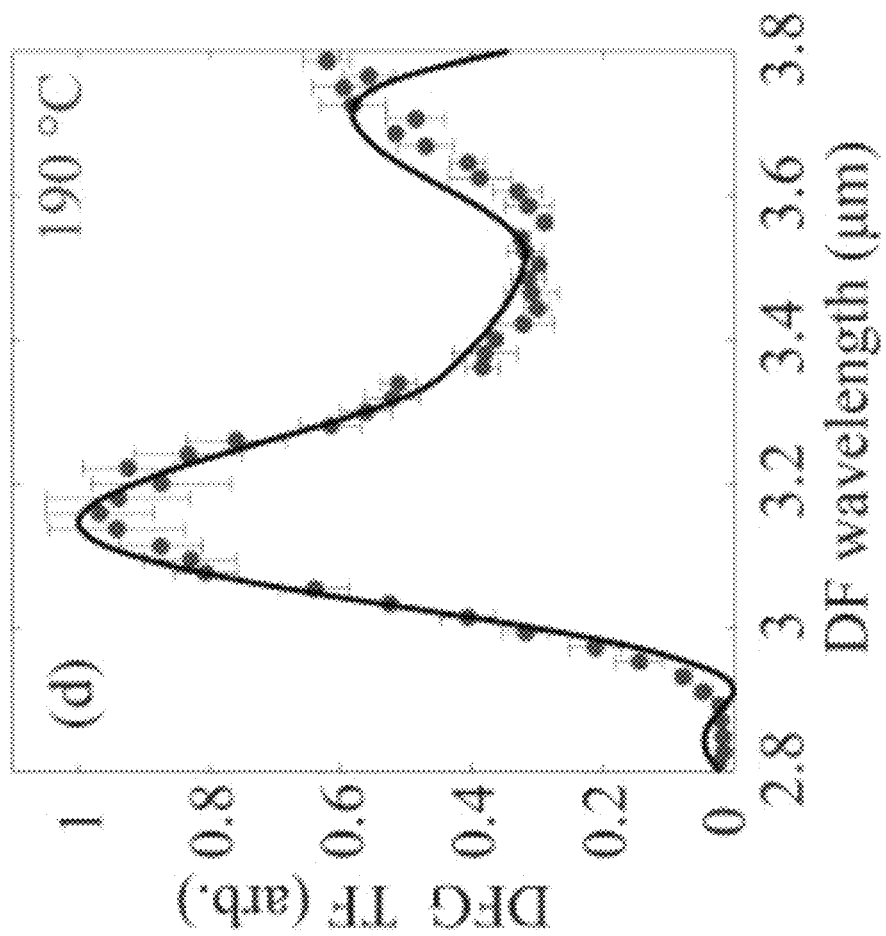
Figure 5E:
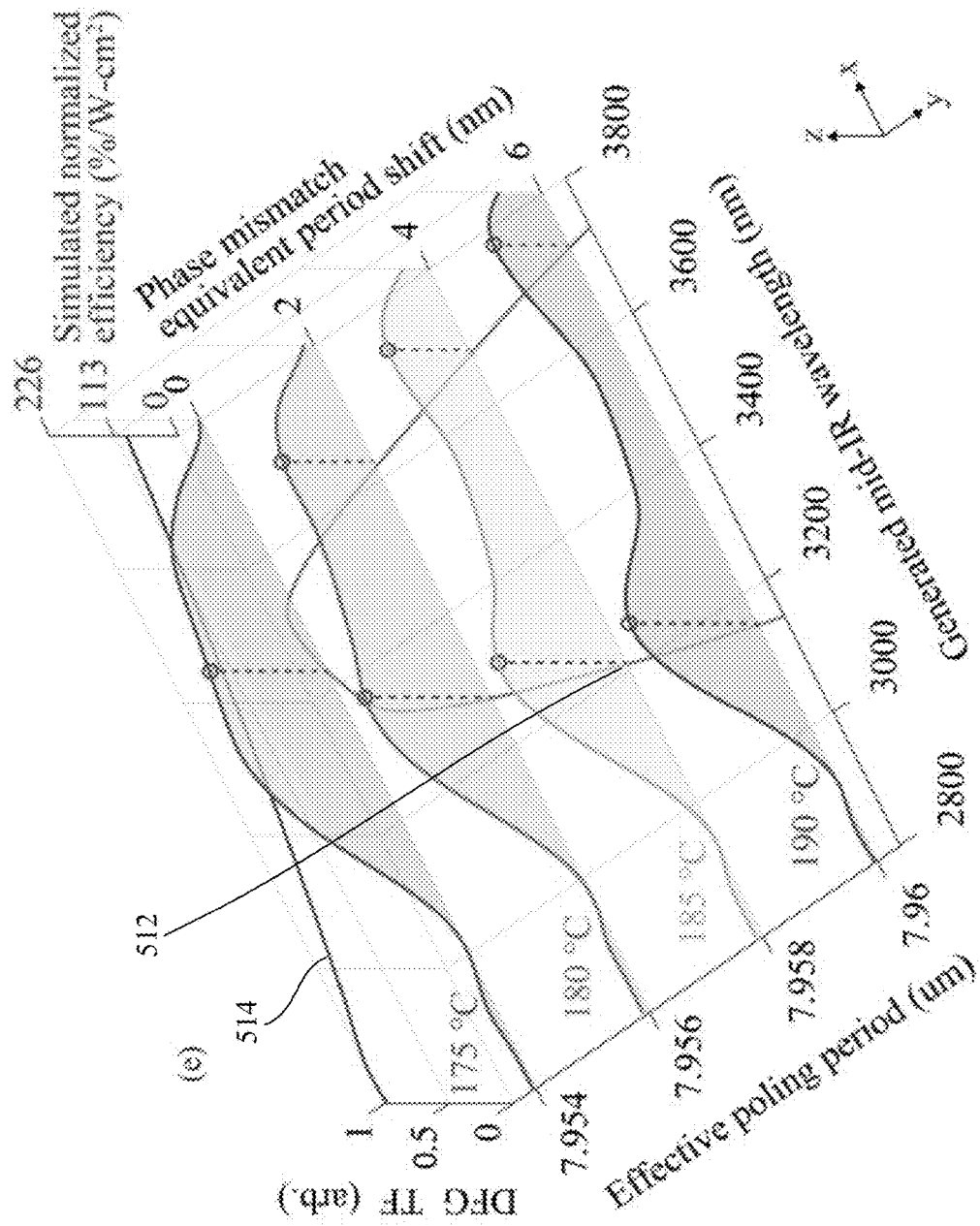
FIG. 5E depicts an illustrative plot of normalized temperature dependent simulated transfer functions from FIGS. 5A-5D, generated mid-IR wavelengths, effective poling period offset, and simulated normalized efficiency, according to example embodiments of this disclosure.

FIG. 5E depicts an illustrative plot 510 of normalized temperature dependent simulated transfer functions from FIGS. 5A-5D, generated mid-IR wavelengths, effective poling period offset, and simulated normalized efficiency, according to example embodiments of this disclosure. As shown, the normalized temperature dependent simulated transfer functions and the generated mid-IR wavelengths (in nm) are plotted on xz plane, the effective poling period offset is plotted on xy-plane, and the simulated normalized efficiency is also plotted in the xz-plane against a second z-axis.

In some embodiments and as illustrated by the plots 502-510, a quasi-phase matched continuous-wave mid-IR difference frequency generation in the 2.8-3.8 µm wavelength range may be observed in a single uniformly poled waveguide device by mixing the tunable signal wave (1.475-1.72 µm) against the fixed pump wave (1.064 µm). For example, plots 502-508 show difference frequency generator transfer functions plotted against the difference-frequency wavelengths at four different temperatures (in the 175-190° C. range) in the same waveguide. Transfer functions can be measured with approximately 18.5 THz full width at half maximum (FWHM) bandwidth (~700 nm) around a center wavelength of 3.4 µm (e.g., as shown in plot 506), and greater than 1 µm or 26.5 THz bandwidth between the zeroes of the transfer function (e.g., as shown in plot 508).

Further, it has been observed that the shapes of the transfer functions may agree with simulations, but it can be noted that there may be two corrections involved: (I) While the poling period for this device (waveguide 1) is nominally 7.957 µm at room temperature, the transfer function obtained at 175° C. fits the simulation for 7.954 µm poling period. The latter can be referred to as the effective poling period, which can account for difference in $\Delta k$ between the simulation and the experiment owing to a number of factors including finite resolution of the simulation, difference between the design target and fabricated waveguide geometries, change of refractive index with temperature, and thermal expansion. (II) With the effective poling period fixed at its value chose to fit at 175° C., simulations including both thermos-optic index changes and thermal expansion may lead to results in agreement with the measured phase matching curves at higher temperatures.

Another way of referring to the temperature tuning of the difference frequency generation transfer function can be that the temperature change induces a phase mismatch by means of both refractive index changes of the thin film lithium niobate and thermal expansion, and can be expressed as an effective poling period shift. The temperature based effective poling period vs wavelength curve (as seen in the curve 512 on xy plane in plot 510) can be the same as the nominal poling period vs wavelength curve at 175° C. in as shown in FIG. 3. This agreement can be shown by the phase matching peaks at 180, 185, and 190° C. lining up with the curve 512. The reason for the deviation of the transfer function at 175° C. from this trend may be that the wavelength dependent DFG efficiency (curve 514 on xz plane in plot 510) can also play a role in determining the shape of these transfer functions.

It also can be observed that rapid tuning of the phase matching can peak with temperature, with a value greater than 10 nm or $$300 \text{ GHz per } ° \text{ C. } \left(\frac{\Delta v}{v} \sim 3.2 * 10^{-3}/° \text{ C.}\right).$$

This temperature tuning of the phase-matching can allow for the observation of the same nonlinear interaction in the next waveguide over (20 nm nominal poling period difference) with every 55° C. change in temperature of the device. However, while the higher temperature range (>150° C.) measurements shown in plots 502-510 can be in good agreement with simulations, the shapes of the transfer functions can be measured at lower temperatures may deviate from simulations. The reason for this deviation at lower temperatures may be that the adsorption of hydroxide (OH) on the air-clad surfaces of the thin film lithium niobate waveguides could result in propagation loss in the mid-IR. When operated in a dry atmosphere (<10% humidity) and high temperature, the adsorbed OH can be driven out, and the transfer function expected in a low-loss regime can be retrieved. Because the OH dependent propagation loss is estimated to be strong around 3 µm and expected to get weaker toward longer wavelengths, the heights of the second peaks (around 3.6-3.7 µm) of both experimental transfer functions can be approximately matched by rescaling the height of the one at 75° C. This can show the effect of loss at the shorter wavelengths in the experimental window.

Figure 6:
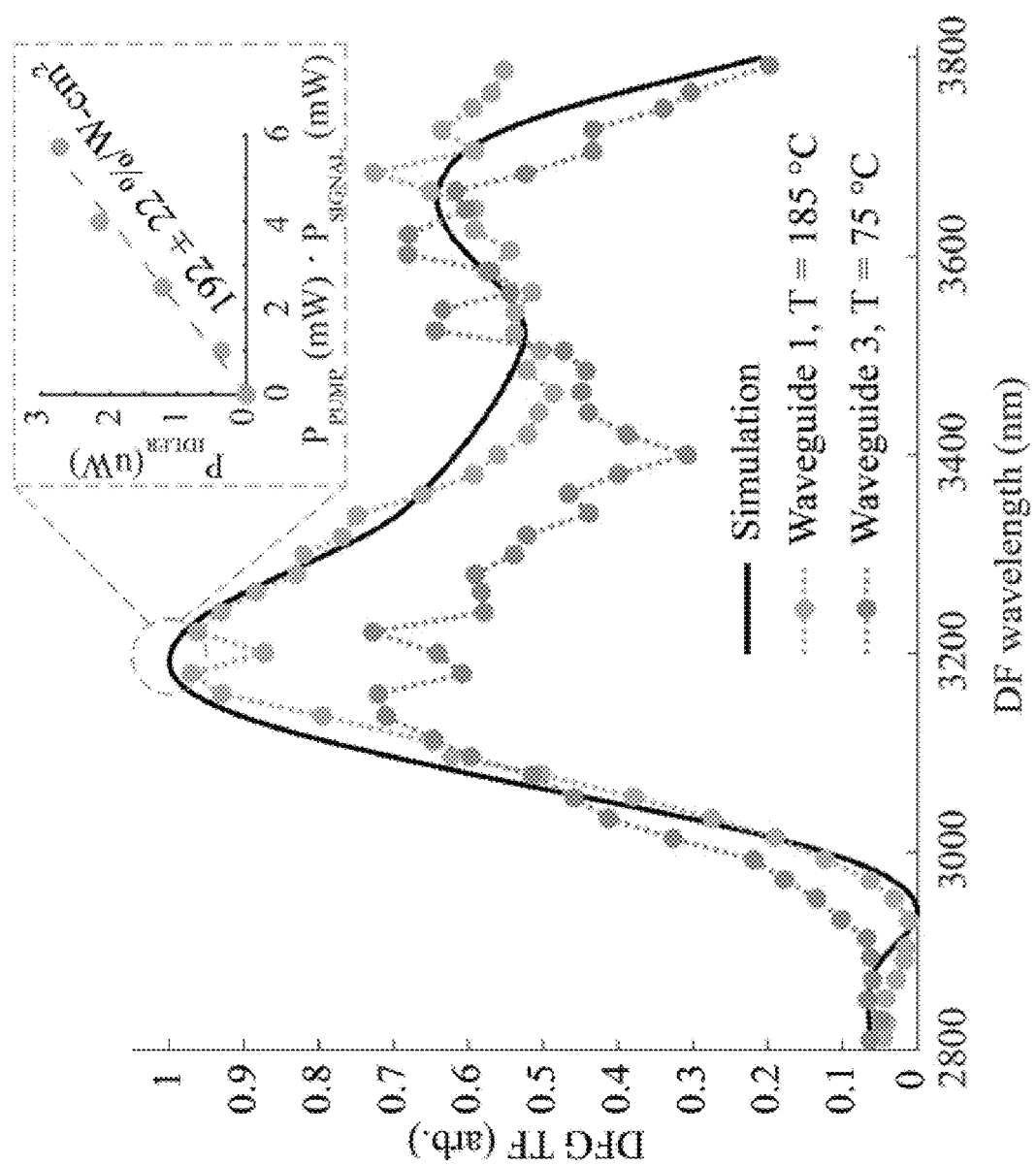
FIG. 6 depicts an illustrative plot showing measured and simulated normalized difference frequency transfer function and difference frequency wavelength at different temperatures for two different waveguides, according to example embodiments of this disclosure.

FIG. 6 depicts an illustrative plot 600 showing measured and simulated normalized difference frequency transfer function and difference frequency wavelength at different temperatures for two different waveguides, according to example embodiments of this disclosure. The dots indicate the measurements and the solid line indicates the simulation. As shown, the measured difference frequency transfer functions for waveguide 1 at 185° C. and waveguide 3 at 75° C. Waveguide 3 may have a nominal poling period of +40 nm relative to waveguide 1. Both the simulation and waveguide 1 difference frequency transfer functions may be normalized to 1, while waveguide 3 difference frequency transfer function can be re-scaled to approximately match the height around 3.6-3.7 µm with that of waveguide 1. The inset shows a change of generated mid-IR (idler wave) power with change of signal power in the transverse electric polarization when pump power (i.e., power of the pump wave) is held constant.

A normalized efficiency may be measured at the phase matching peak at 185° C. For this measurement, the pump and signal wavelengths, as well as their powers, may be held constant. The content of transverse polarization in the signal wave may be changed by rotating the second half-waveplate (e.g., waveplate 410b shown in FIG. 4) in its path. The generated difference frequency power may be observed to be linearly dependent (as shown in the inset) on the signal transverse electric power, where the latter can be detected by using a linear polarizer before a Ge detector (e.g., Ge power meter 434 shown in FIG. 4). The powers of the three waves detected on the respective detectors, in combination with the respective collection efficiencies for the output objective, may be used to derive the amount of power at each wavelength in the waveguide. A normalized difference frequency generation efficiency of $102\pm8\%/W\text{-}cm^2$ can be calculated in the low-conversion limit by taking the ratio of the on-chip mid-IR power (at the output of the waveguide) over the product of the on-chip pump and signal (transverse electric) powers. The experimental value was demonstrated to be reasonably close to the simulated difference frequency generation normalized efficiency of $167\%/W\text{-}cm^2$.

The present embodiments can therefore relate to a nanophotonic ultra-broadband near-IR to mid-IR wavelength converter in the thin film lithium niobate on sapphire platform that uses dispersion engineering to achieve a about 5 times larger difference frequency generation bandwidth than other periodically poled lithium niobate (PPLN) based equal-length single-pass mid-IR generators, and also can benefit from the sub-wavelength mode confinement to achieve 1-3 orders of higher internal normalized efficiency compared to conventional devices. The generated mid-IR light can be tuned within the large phase matching bandwidth by tuning the frequency of a telecom-band signal wave, while the 1.064 µm pump wave can be fixed. By changing the device temperature, the phase matching peak itself can be tuned over the entire 2.5-4 µm mid-IR window and possibly wider, at a rate that is one of the highest reported in this platform. Further, an observed mid-IR loss in these waveguides can be due to adsorbed OH at the air-clad surfaces of the thin film lithium niobate waveguides, and found certain conditions (high temperature, how humidity) can minimize these losses in the 3-4 µm band.

Figure 7:
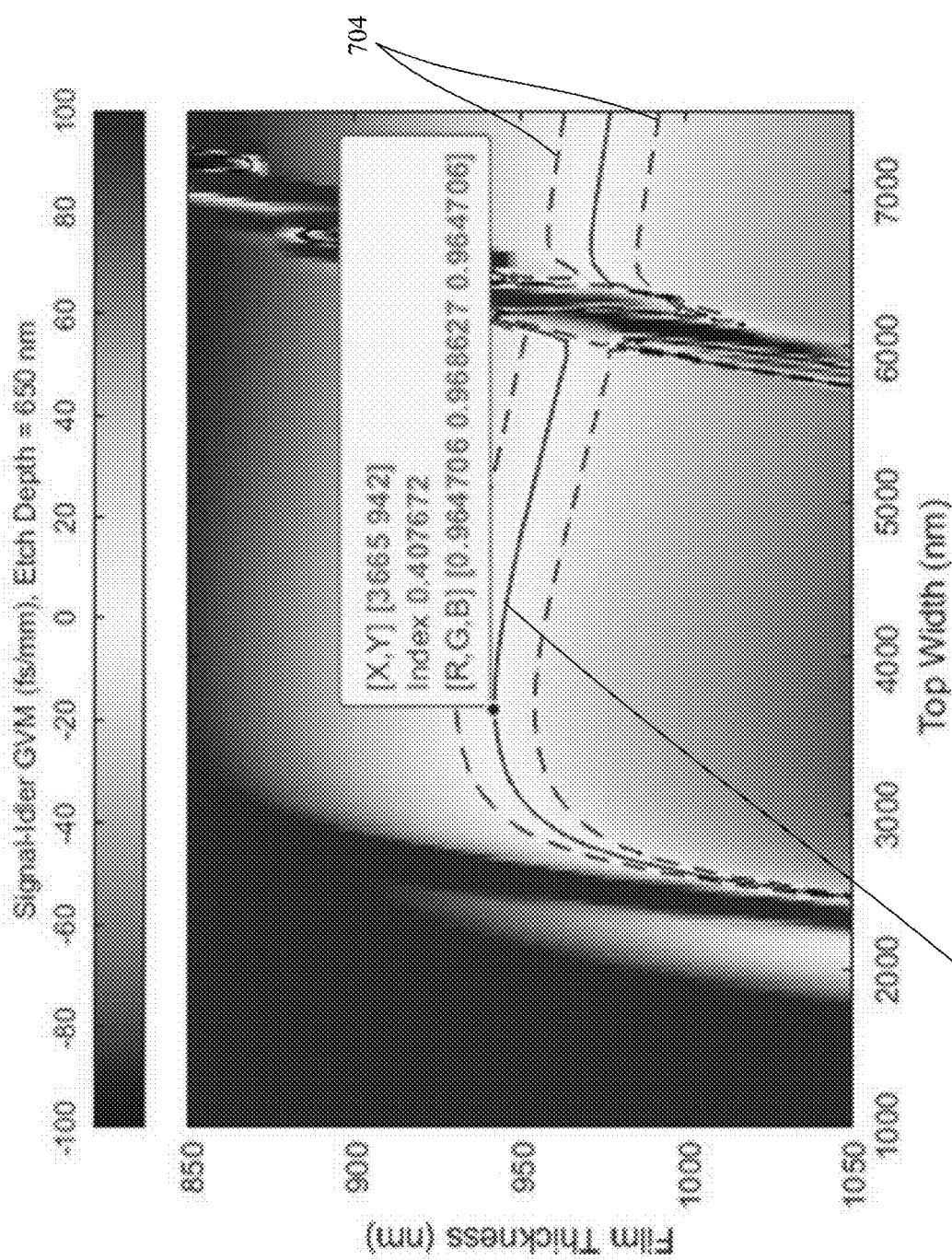
FIG. 7 depicts an illustrative plot for determining design tolerances of a waveguide based on minimizing group velocity mismatch, according to example embodiments of this disclosure.

FIG. 7 depicts an illustrative plot 700 of determining design tolerances of a waveguide based on minimizing group velocity mismatch, according to example embodiments of this disclosure. As discussed above, it may be desirable to make signal wave-idler wave group velocity mismatch close to zero to get broadband difference frequency generation transfer functions. For example, group velocity mismatch being close to zero may incur nominally near a waveguide geometry of 3665 nm (top width)×942 nm (film thickness)×650 nm etch depth. For example, in the plot the etch depth may be kept constant at 650 nm while the top width (x-axis) and film thickness (y-axis) may be swept. As shown curve 702 represents where the group velocity mismatch is 0, and curves 704 represent the boundary where the group velocity mismatch is less than 10 fs/mm.

The group velocity mismatch may remain close to zero ($|GVM|<10$ fs/mm) for the following ranges—top width: 3050 nm-5160 nm (tolerance+/−600 nm); film thickness: 930 nm-955 nm (tolerance+/−15 nm). In some embodiments, film thickness may be compensated with width (differential width dw) and etch depth (differential etch depth dh): dw/dh=−0.12 fs/mm/nm (tolerance+/−50 nm). The period may include nominal period (at 30° C.) of 8.01738 µm. Assuming dw~50 nm, dh~10 nm, and dy (differential film thickness)~2 nm, the total period error can be bounded at +/−40 nm. For example, if there are 25 waveguides with +/−12 on each side, only ~3.3 nm steps may be needed per waveguide.

Figure 8:
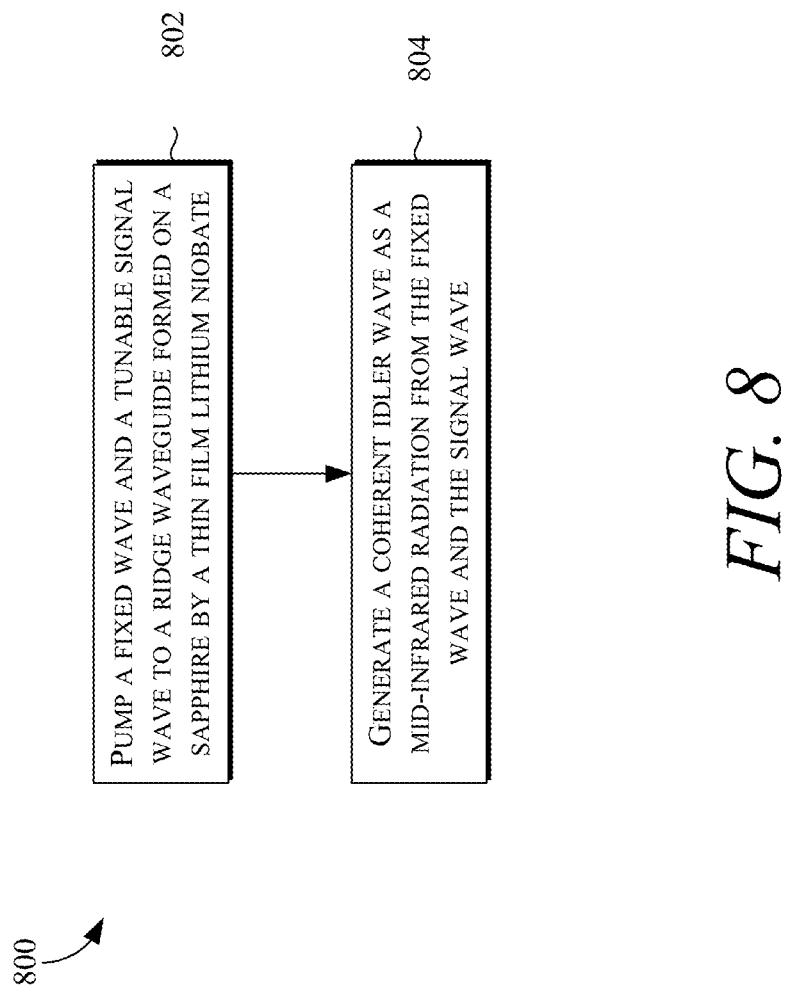
FIG. 8 depicts a flow diagram of an example method of generating a mid-IR radiation, according to example embodiments of this disclosure.

FIG. 8 depicts a flow diagram of an example method 800 of generating a mid-IR radiation, according to example embodiments of this disclosure. It should be understood that the steps of the method 800 are just examples and methods with alternative, additional, or fewer number of steps should be considered within the scope of this disclosure.

At step 802, a fixed wave and a tunable signal wave may be pumped to a ridge waveguide formed on a sapphire by a thin film lithium niobate. The thin film lithium niobate may have a predetermined film thickness. The waveguide may have a predetermined etch depth and a predetermined top width.

At step 804, the waveguide may generate a coherent idler wave as the mid-IR radiation from the fixed wave and the signal wave. The coherent idler wave may be generated based on tuning of the predetermined film thickness, the predetermined etch depth, and the predetermined top width.

Figure 9:
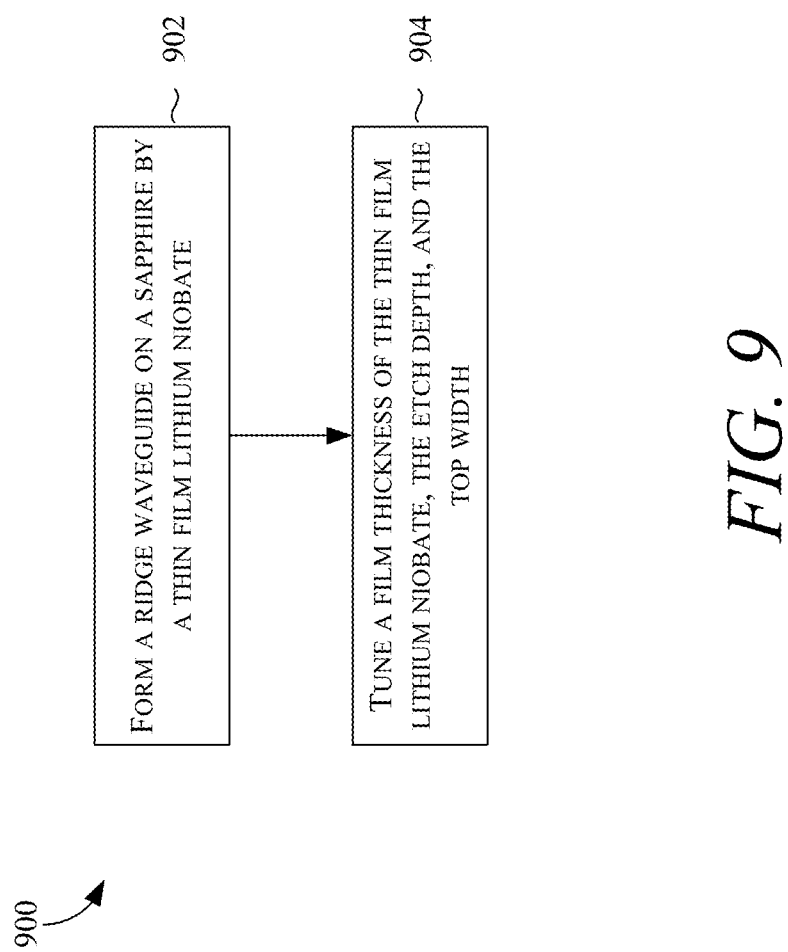
FIG. 9 depicts a flow diagram of an example method of manufacturing a device for generating mid-IR radiation, according to example embodiments of this disclosure.

FIG. 9 depicts a flow diagram of an example method 900 of manufacturing a device for generating mid-IR radiation, according to example embodiments of this disclosure. It should be understood that the steps of the method 900 are just examples and methods with alternative, additional, or fewer number of steps should be considered within the scope of this disclosure. The steps of the method 900 may be performed by a fabrication machine at a factory setting.

At step 902, the fabrication machine may form a ridge waveguide on a sapphire by a thin film lithium niobate. The so formed waveguide may have an etch depth and a top width.

At step 904, the fabrication machine may tune a film thickness of the thin film lithium niobate, the etch depth, and the top width. The tuning may cause the device to generate, during deployment, a coherent idler wave as a mid-infrared radiation based on a fixed pump wave and a tunable signal wave.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A tunable device for generating mid-infrared radiation, the tunable device comprising:
a thin film quadratic nonlinear waveguide formed on a mid-infrared transparent cladding by a thin film material of a predetermined film thickness, the thin film quadratic nonlinear waveguide having a predetermined etch depth and a predetermined top width; and
at least one of the predetermined film thickness, the predetermined etch depth, and the predetermined top width being tuned for:
the tunable device to generate a coherent idler wave as a mid-infrared radiation from a fixed pump wave and a tunable signal wave, and
an optical parametric amplification of either the tunable signal wave or the coherent idler wave, both the tunable signal wave and the coherent idler wave being broadly tunable in presence of the fixed pump wave and for a poling period and a temperature.

2. The tunable device of claim 1, wherein the thin film material comprises lithium niobate.

3. The tunable device of claim 1, wherein at least one of the predetermined film thickness, the predetermined etch depth, and the predetermined top width are tuned for generating a broadband difference frequency for the coherent idler wave from the fixed pump wave and the tunable signal wave.

4. The tunable device of claim 1, wherein the mid-infrared transparent cladding comprises a sapphire.

5. The tunable device of claim 1, wherein the mid-infrared transparent cladding comprises a multilayer cladding.

6. The tunable device of claim 1, wherein the tunable device generates the coherent idler wave with phase matching peaks configured to be tuned with temperature.

7. A method of generating mid-infrared radiation, the method comprising:
pumping a fixed wave and a tunable signal wave to a thin film quadratic nonlinear waveguide formed on a mid-infrared transparent cladding by a thin film material of a predetermined film thickness, the thin film quadratic nonlinear waveguide having a predetermined etch depth and a predetermined top width;
generating, by the thin film quadratic nonlinear waveguide based on tuning of at least one of the predetermined film thickness, the predetermined etch depth, and the predetermined top width, a coherent idler wave as a mid-infrared radiation from the fixed wave and the tunable signal wave; and
performing, by the thin film quadratic nonlinear waveguide based on the tuning of at least one of the predetermined film thickness, the predetermined etch depth, and the predetermined top width, an optical parametric amplification of either the tunable signal wave or the coherent idler wave, both the tunable signal wave and the coherent idler wave being broadly tunable in presence of the fixed pump wave and for a poling period and a temperature.

8. The method of claim 7, wherein the thin film material comprises lithium niobate.

9. The method of claim 7, wherein at least one of the predetermined film thickness, the predetermined etch depth, and the predetermined top width are tuned for generating a broadband difference frequency for the coherent idler wave from the fixed pump wave and the tunable signal wave.

10. The method of claim 7, wherein the mid-infrared transparent cladding comprises a sapphire.

11. The method of claim 7, wherein the mid-infrared transparent cladding comprises a multilayer cladding.

12. The method of claim 7, wherein generating the coherent idler wave comprises:
generating, by the thin film quadratic nonlinear waveguide, the coherent idler wave with phase matching peaks that can be tuned with temperature.

13. A method of manufacturing a device for generating mid-infrared radiation, the method comprising:
forming a thin film quadratic nonlinear waveguide on a mid-infrared transparent cladding by a thin film material, the thin film quadratic nonlinear waveguide having an etch depth and a top width;
tuning at least one of a film thickness of the thin film material, the etch depth, and the top width for the device to generate a coherent idler wave as a mid-infrared radiation from a fixed pump wave and a tunable signal wave; and
tuning at least one of the film thickness, the etch depth, and the top width such that an optical parametric amplification of either the tunable signal wave or the coherent idler wave, both the tunable signal wave and the coherent idler wave being broadly tunable in presence of the fixed pump wave and for a poling period and a temperature.

14. The method of claim 13, wherein the thin film material comprises lithium niobate.

15. The method of claim 13, further comprising:
tuning at least one of the film thickness, the etch depth, and the top width such that the device generates a broadband difference frequency for the coherent idler wave from the fixed pump wave and the tunable signal wave.

16. The method of claim 13, further comprising:
using sapphire or multilayer cladding as the mid-infrared transparent cladding.

17. The method of claim 13, wherein the etch depth is greater than approximately 600 nm.

* * * * *